United States Patent [19]
Hassel

[11] Patent Number: 5,444,184
[45] Date of Patent: Aug. 22, 1995

[54] METHOD AND CABLE FOR TRANSMITTING COMMUNICATION SIGNALS AND ELECTRICAL POWER BETWEEN TWO SPACED-APART LOCATIONS

[75] Inventor: ARild Hassel, Drammen, Norway

[73] Assignee: Alcatel Kabel Norge AS, Oslo, Norway

[21] Appl. No.: 16,065

[22] Filed: Feb. 10, 1993

[30] Foreign Application Priority Data

Feb. 12, 1992 [NO] Norway ............................ 920544

[51] Int. Cl.⁶ .......................................... H01B 7/00
[52] U.S. Cl. ........................ 174/113 R; 174/113 C; 174/121 A; 340/854.9; 379/90
[58] Field of Search .......... 174/113 R, 113 A, 113 C, 174/115, 116, 110 R, 261, 121 R, 121 A, 107, 121 SR; 379/90, 397; 307/11, 13, 14, 16–18, 21, 24, 28, 37, 42; 340/850, 854.9

[56] References Cited

U.S. PATENT DOCUMENTS

| | | | |
|---|---|---|---|
| 2,180,731 | 11/1939 | Dickinson | 174/105 B |
| 3,023,267 | 2/1962 | Rubinstein et al. | 174/115 |
| 3,120,575 | 2/1964 | Hudson | 174/115 |
| 3,489,844 | 1/1970 | Motley | 174/32 |
| 3,517,110 | 6/1970 | Morgan | 174/47 |
| 3,894,172 | 7/1975 | Jachimowicz et al. | 174/34 |
| 4,110,554 | 8/1978 | Moore et al. | 174/101.5 |
| 4,156,869 | 5/1979 | Schukantz | 174/108 X |
| 4,250,351 | 2/1981 | Bridges | 174/106 R |
| 4,600,806 | 7/1986 | Beretta | 174/121 A |
| 4,647,720 | 3/1987 | Vokey | 174/107 |
| 4,654,476 | 3/1987 | Barnicol-Ottler et al. | 174/116 |
| 4,707,569 | 11/1987 | Yoshimura et al. | 174/116 |
| 4,755,629 | 7/1988 | Beggs et al. | 174/34 |
| 4,860,343 | 8/1989 | Zetena, Jr. | 174/34 X |
| 4,873,393 | 10/1989 | Friesen et al. | 174/34 |
| 4,941,729 | 7/1990 | Hardin et al. | 174/107 X |
| 5,065,133 | 11/1991 | Howard | 340/310.1 |
| 5,070,522 | 12/1991 | Nilssen | 174/115 X |
| 5,280,137 | 1/1994 | Ward | 174/120 SR |

FOREIGN PATENT DOCUMENTS

| | | |
|---|---|---|
| 0076437 | 4/1983 | European Pat. Off. |
| 463341 | 1/1992 | European Pat. Off. |
| 3220392 | 10/1987 | Germany |
| 1257325 | 12/1971 | United Kingdom |
| 2188818 | 4/1986 | United Kingdom |

*Primary Examiner*—Leo P. Picard
*Assistant Examiner*—Christopher Horgan
*Attorney, Agent, or Firm*—Ware, Fressola, Van der Sluys & Adolphson

[57] ABSTRACT

This invention relates to a method for transmitting communication signals and electrical power on a cable between two spaced apart locations, for example between a land based control center and an offshore installation. The communication signals are transmitted over at least two twisted pairs The conductors of each twisted pair are connected in parallel to constitute a power conductor. The communication and power transmissions are separated by transformers. The invention also relates to a cable for performing the method. The cable includes at least two power conductors, each being constituted by one pair of twisted insulated conductors, enclosed within an insulation sheath and outer armor and corrosion protection.

12 Claims, 3 Drawing Sheets

METHOD AND CABLE FOR TRANSMITTING COMMUNICATION SIGNALS AND ELECTRICAL POWER BETWEEN TWO SPACED-APART LOCATIONS

The present invention relates to a method for transmitting communication signals and electrical power on a cable between two spaced apart locations, in particular from a land based control center or an offshore installation, to a subsea installation. The invention also relates to cables for performing the method.

DESCRIPTION OF RELATED ART

When new offshore oil and gas fields are developed, certain installations can be made subsea in order to avoid costly platform investments. It has been shown that well control can be performed over long distances.

SUMMARY OF THE INVENTION

The present invention is to provide a method for operating wellhead controls from a shore based control center to a subsea well system with a distance up to 170 km and more.

In connection with a particular field it seems feasible to arrange a manifold center approx 130 km from land. The different wells can be tied in to this manifold. The wells can be arranged in templates each having 3-5 wells. The distance from the manifold center can be 20-40 km.

It is estimated that each template will require electrical power in the order of 2 kW, and that a main cable leading from shore to the manifold should be capable of transferring power loads in the order of 20 kW. The basic load will be power supply for electronics. In addition, each template will have a local hydraulic supply which will be powered with electric motors. The electric motors will run only when the accumulator pressure falls below a preset value. This will cause variations in the actual power demand. The communication signal transmission rate should be minimum 1200 baud.

Basically we have tried to find a solution comprising a cable which can transmit both electrical power and electrical signals over the required distance. Signal transmission over very large distances combined with power transmission is, however, a very challenging task, and raises a number of questions.

Several systems have been studied for dealing with the above requirements, such as pure DC systems. An alternative solution is to use an AC cable with fiber optic signal transmission. Still another alternative was to superimpose communication signals on the power voltage. A better solution is however provided with the present invention.

According to the present invention, communication and electrical power are provided on a cable between two spaced-apart locations, wherein the communication signals are transmitted over at least two twisted pairs, the conductors of each twisted pair being connected in parallel to constitute a power conductor, and wherein the communication and power transmissions are separated by transformers.

In further accord with the present invention, the cable for transmitting the communication signals and electrical power between the two spaced-apart locations includes at least two power conductors, each being constituted by one pair of twisted insulated conductors, and closed within an insulation sheath and outer armour, and having corrosion protection.

In still further accord with the present invention, the cable comprises three paired power conductors for transmission of three-phase power, the three pairs being used for transmitting three communication channels.

In further accord with the present invention, each of the conductors of the cable is multi-stranded or solid annealed copper.

In still further accord with the present invention, the cable conductor insulation comprises thermoplastic polyethylene with a thickness required for transmission of the rated power voltage.

Further in accord with the present invention, the cable core is laid with insulating fillers filled with a filling compound, such as a petroleum jelly and wrapped with a polyester tape.

Further still in accord with the present invention, the armour comprises two layers of galvanized steel wires laid in opposite directions.

Experiments and studies have shown that the present invention provides for a method which solves the many questions raised. Neither the common mode signals nor the transformed power voltage need to be filtered or eliminated at the communication terminals. Transformers and electronics are used in order to achieve the simplest total system.

These and other objects, features and advantages of the present invention will become more apparent in light of the detailed description of a best mode embodiment thereof, as illustrated in the accompanying drawing.

DESCRIPTION OF THE PREFERRED EMBODIMENTS

Figure 1:
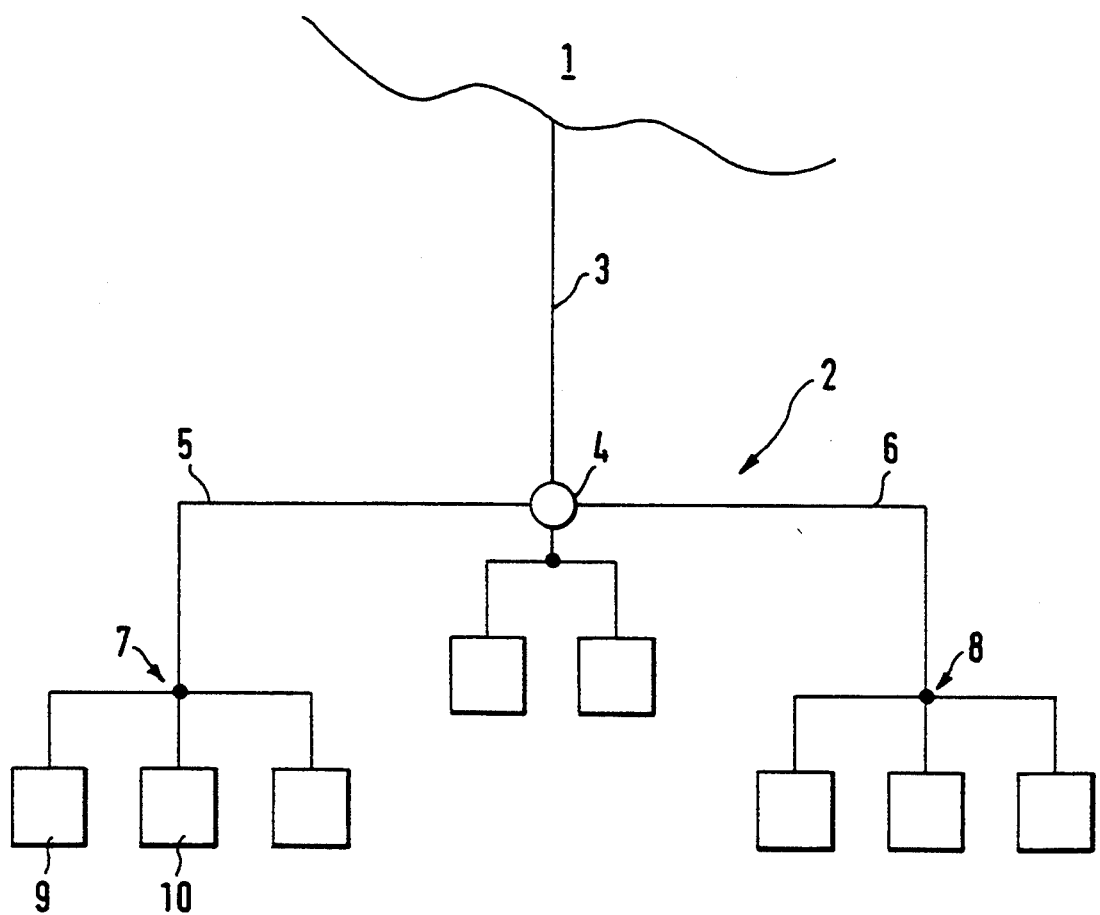
FIG. 1 illustrates a typical field layout.

In FIG. 1 is illustrated how a subsea field installation 1 is connected to a shore installation 2 via a cable 3. The installation on shore is not shown. The cable 3 leads to a manifold center 4 from which cables 5 and 6 lead respectively to templates 7 and 8 having a number of wells 9, 10 also.

The cables 3, 5 and 6 shall as mentioned transmit electrical power as well as electrical control signals. The basic idea is to use three insulated twisted pairs as a three phase cable,—or two insulated pairs as a none phase cable. Each pair is connected in parallel for the power transmission, and each pair is used as a signal pair for signal transmission.

Figure 2:
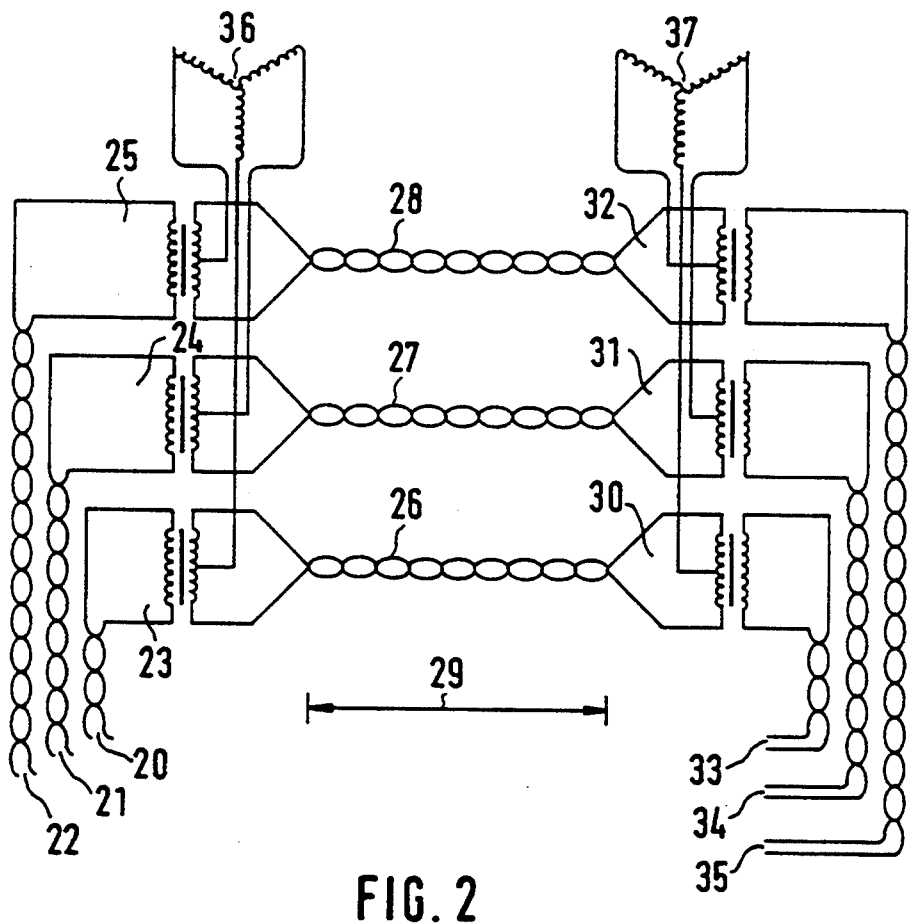
FIGS. 2 and 3 illustrate wiring diagrams.

A wiring diagram for the three phase circuit is illustrated in FIG. 2, the shore side being on the left side of the drawing, or vice versa. Three signalling pairs 20, 21, 22 are connected respectively to the low voltage side of transformers 23, 24 and 25. One of the pairs 20 may be used for transmitting signals to the offshore side on the right hand side of the drawing. A different pair 21 may be used for transmitting signals from a subsea installation to a shore installation, and the third pair 22 may be a spare pair. Alternatively, at least one of the pairs may be used for semi-duplex transmission of signals.

The transformed signals pass respectively over three twisted cable pairs 26, 27 and 28 of a cable 29 to the high voltage side of a second set of transformers 30, 31 and 32, in which the signals are transformed to be connected to three signal pairs 33, 34 and 35 on the offshore side.

Electrical power is transmitted from one star/delta connection 36 to a second star/delta connection 37 via three cable conductors which are constituted by the 'pair'-conductors 26, 27 and 28 of the cable 29. Each phase of the power is connected to the center of the high voltage winding of the transformers and do therefore not interfere with the signal transmission on the low voltage side of the transformers. No differential power voltage is connected to the signal pairs in the differential mode and the filtering task is therefore several orders of magnitude easier than with conventional super imposed technique.

Figure 3:
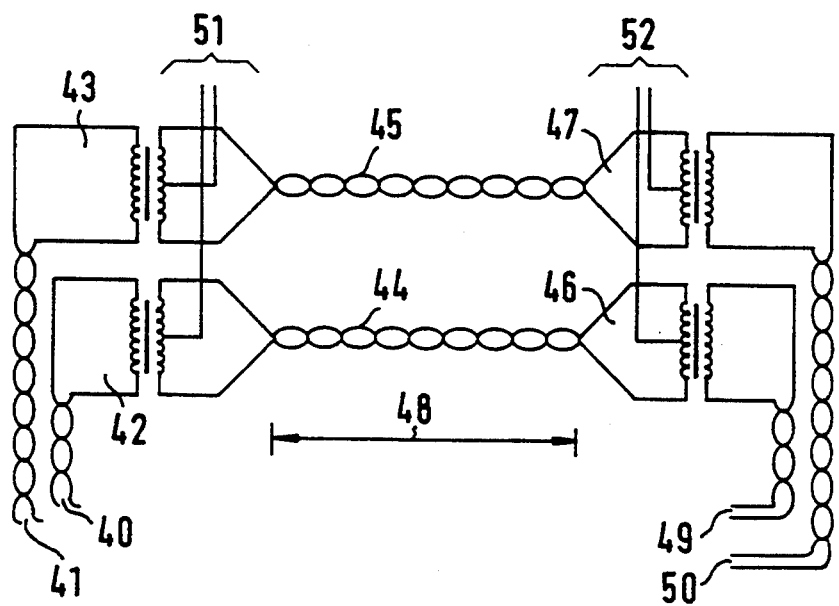

In FIG. 3 is illustrated a similar circuit diagram for a one phase system. Two signal pairs 40 and 41 are connected over two transformers 42 and 43 and two twisted cable pairs 44 and 45, two transformers 46 and 47 at the other end of the cable 48 to two signal pairs 49 and 50 on the other side of the transmission system. AC power is transferred from one side 51 to the other 52 via the high voltage side of the transformers 42, 43 and 46, 47 and the two 'pair'-conductors 44 and 45.

Figure 4:
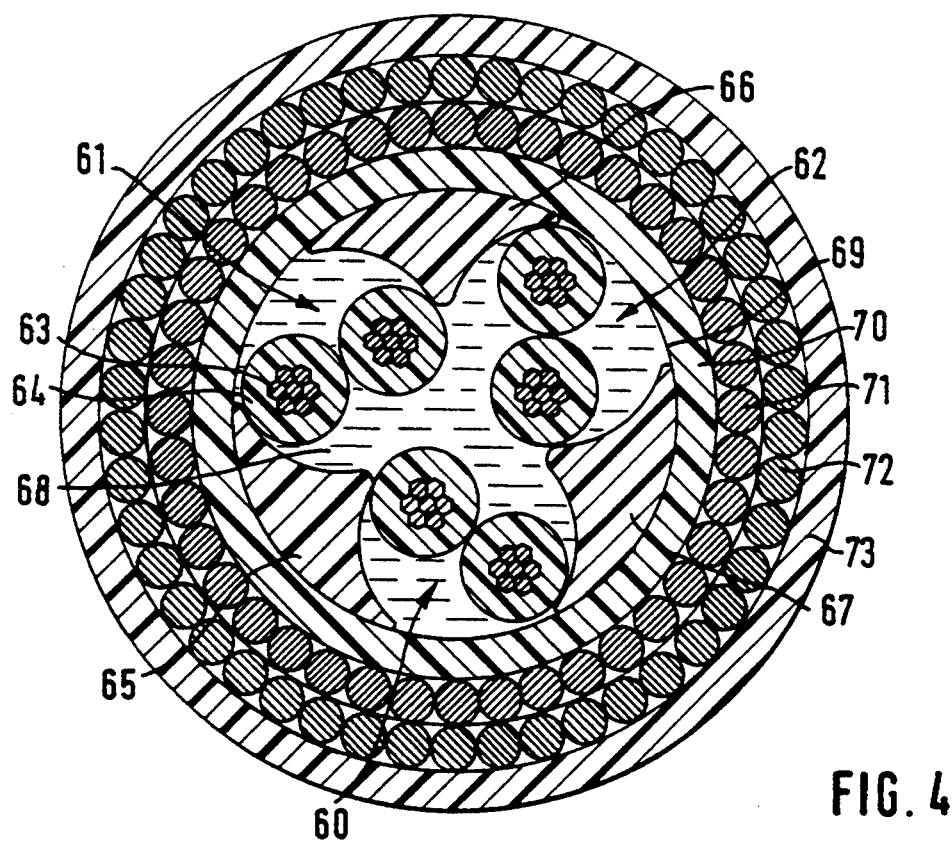
FIGS. 4 and 5 illustrate crossection of two cables.

In FIG. 4 is schematically illustrated a crossection of a cable (29, FIG. 2) which is suitable for transmitting power as well as signals over long distances. The cable comprises three pairs 60, 61 and 62 of twisted conductors. Each conductor is a multi strand or solid copper conductor 63 provided with insulation 64 to provide a high quality power conductor. Such a conductor is also a good conductor for signal transmission. This includes both the size of the conductor and the quality of the insulation.

The lay up is somewhat conservative with respect to diameter increase as the pairs are laid up as circular elements. This will eventually give potential for a corresponding diameter/weight reduction.

The conductors shown consist of stranded, annealed copper wires. The insulation consists of a thermoplastic polyethylene. Each conductor is insulated for a certain operating voltage.

The insulation material should be capable of being processed within tight tolerances. This is very important for the signal/noise transmission properties. The material should have high dielectric strength, low dielectric constant, low tan delta, high insulation resistance and the water absorption is very low.

Polyethylene is preferred in order to be compatible with the existing technology for molding of joints and penetrators.

The lay up is as follows: Two insulated conductors are twisted in a pair configuration to improve signal crosstalk and the power (harmonic) related noise immunity during normal operations and transient conditions. Each twisted pair will act as one power phase as the conductors are connected in parallel.

The three twisted pairs are laid up to form a three core cable. The cable core is laid up with insulating fillers 65, 66 and 67, filled with a filling compound 68 and wrapped with polyester tape 69. The filling is done to prevent moisture penetration and thereby obtain stable electrical performance. The compound may be petroleum jelly, not harmful to any cable components. A polyethylene sheath 70 is extruded over the laid up pairs.

The cable armour shown consists of two layers of round galvanized steel wires 71, 72. The outer layer of armour wires are laid in the opposite direction of the inner layer. The counter helical wire armour is torsion balanced. This feature is preferable to avoid twisting of the cable especially during the laying operation. If the manifold center (4, FIG. 1) is some kind of surface installation, the cable must have a dynamic riser which requires a two layer torsion balanced armour.

Over the armour wires 71, 72 there is applied a corrosion protection layer 73. This layer can be servings of jute impregnated with asphalt, or servings of a bitumen impregnated polypropylene yarn which is less prone to microbiological degradation. Alternatively the outer serving can be an extruded layer of polyethene. This gives a better corrosion protection, but has disadvantages as this prohibits a continuous earthing of the armour wires.

Figure 5:
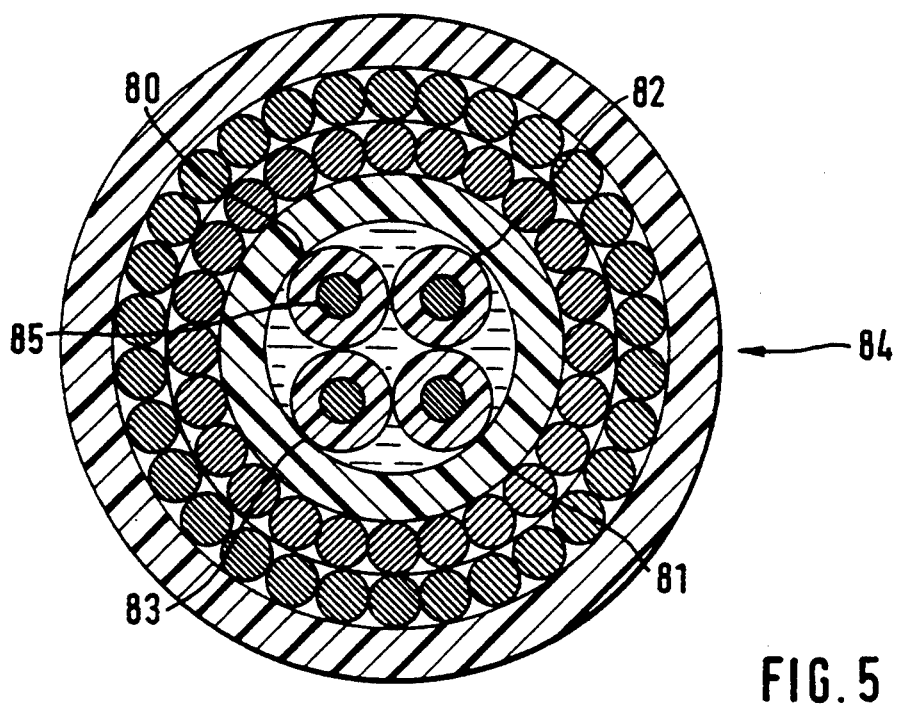

In FIG. 5 is illustrated the crossection of a cable (48, FIG. 3) having two twisted pairs 80/81 and 82/83 making up a star quad and the core of a cable 84 similar to that described in connection with FIG. 4. The outer layers may be as in FIG. 4. The conductors are shown as solid wires 85.

When making cables as long as some 130 to 170 km it will normally be necessary to make factory joints. In a factory joint the copper conductor is usually jointed by means of brazing. Such conductor joint gives electrical resistivity equal or less than the cable conductor. It gives mechanical strength close to cable conductor itself (approx. 90%) and it gives no diameter increase. The dielectric in the joint is primarily a molded joint. Alternatively, the melting and heat shrinking tube technique can be used. When the jointing of the conductors is completed, the lay-up of the cable elements takes place. Since there are only a minor diameter increase on each power core, this will not cause problems in the further production of the cable.

Field joints or repair joints of the conductors are basically equal to the factory joints, but jointing of the conductors and insulation will have to be done when the cable is in a laid up configuration.

Studies have shown that the above described cable alternative for long distance communication is a reliable solution.

I claim:

1. Apparatus for transmitting communication signals and electrical power signals between two remote locations, comprising:
   at least two twisted pairs having at least one twisted pair for transmitting the communication signals, and having conductors connected in parallel for transmitting electrical power signals; and
   transformer means being connected to said at least two twisted pairs for separating the transmission of the communication signals and the electrical power signals.

2. Apparatus according to claim 1, wherein said apparatus includes a cable having said at least two twisted pairs and at least two power conductors, each of said at least two power conductors being constituted by one pair of twisted insulated conductors, and said cable also having an insulation sheath, an outer armour and a corrosion protection layer for enclosing said at least two twisted pairs.

3. Apparatus according to claim 2, wherein the cable further comprises three paired power conductors for transmission of three phase power, the three paired power conductors being used for transmitting three communication channels.

4. Apparatus according to claim 2, wherein each of said at least two power conductors comprises a multi strand or solid annealed copper wires.

5. Apparatus according to claim 4, wherein the cables further includes conductor insulation surrounding said multi strand or solid annealed wires which is made of thermoplastic polyethylene with a thickness required for transmission of the rated power voltage.

6. Apparatus according to claim 2, wherein the cable has a core with insulating fillers, is filled with a filling compound such as a petroleum jelly and wrapped with a polyester tape.

7. Apparatus according to claim 2, wherein the outer armour comprises two layers of galvanized steel wires wound in opposite directions.

8. Apparatus according to claim 1, wherein said apparatus is arranged in a three phase circuit for connection to a star/delta power connection, comprising:
three twisted pairs;
three pairs of transformers, each having a high voltage side; and
each of said three twisted pairs being connected between respective high voltage sides of a corresponding one of said three pairs of transformers.

9. Apparatus according to claim 8, wherein each transformer of said three pairs of transformers has a respective center of the high voltage side for connecting to a separate phase conductor of the star/delta power connection.

10. Apparatus according to claim 8, wherein said apparatus is arranged in a one phase circuit for connection to AC power connections, comprising:
two twisted pairs;
two pairs of transformers, each having a high voltage side; and
each of said two twisted pairs being connected between respective high voltage sides of a corresponding one of said two pairs of transformers.

11. Apparatus according to claim 10, wherein each transformer of said two pairs of transformers has a respective center of the high voltage side for connecting to a separate phase conductor of the AC power connections.

12. Cable for transmitting electric power and communication signals, characterized in that the cable has a core comprising at least two power conductors, each having two twisted, insulated conductors and being surrounded by an insulation sheath, armour and corrosion protection.

* * * * *

UNITED STATES PATENT AND TRADEMARK OFFICE
CERTIFICATE OF CORRECTION

PATENT NO.   : 5,444,184
DATED        : August 22, 1995
INVENTOR(S)  : Arild Hassel It is certified that error appears in the above-indentified patent and that said Letters Patent is hereby corrected as shown below:

On the title page, item [75]
    delete "ARild Hassel" and insert --Arild Hassel--.

Signed and Sealed this

Twelfth Day of December, 1995

Attest:

BRUCE LEHMAN

*Attesting Officer*            *Commissioner of Patents and Trademarks*